Oct. 6, 1959     R. O. DAVIS     2,907,446
PALLET CONVEYOR MECHANISM

Original Filed June 22, 1950     4 Sheets-Sheet 1

INVENTOR.
ROBERT O. DAVIS
BY
FINN G. OLSEN
ATTORNEY

Oct. 6, 1959

R. O. DAVIS 2,907,446

PALLET CONVEYOR MECHANISM

Original Filed June 22, 1950

INVENTOR.
ROBERT O. DAVIS
BY
FINN G. OLSEN
ATTORNEY

United States Patent Office 2,907,446
Patented Oct. 6, 1959

2,907,446

PALLET CONVEYOR MECHANISM

Robert O. Davis, Adrian, Mich., assignor to Gene Olsen Corporation, Adrian, Mich, a corporation Original application June 22, 1950, Serial No. 169,750, now Patent No. 2,789,335, dated April 23, 1957. Divided and this application July 18, 1956, Serial No. 598,605

4 Claims. (Cl. 198—159)

This invention relates generally to a molding machine and more particularly, but not exclusively, to a pallet handling mechanism for use with a concrete block making machine having an open bottom mold box adapted to be closed by a pallet during filling thereof with a moldable concrete mix and during compaction of the concrete mix to form a block, the pallets being automatically raised into operative position prior to the filling and compaction of the material and being subsequently lowered after the molding of the block is completed. This is a division of my prior application, Serial No. 169,750, filed June 22, 1950, now Patent No. 2,789,335.

In concrete molding machines of the above type, it has been previously necessary to supply empty pallets to the machine at one end thereof and remove the finished block and accompanying pallet at the opposite or discharge end of the machine. With such an arrangement, it is normally necessary to employ at least two operators, one at each end of the machine, in order that the machine may be continuously and somewhat economically operated. This is true particularly when using a fully automatic, cyclic machine since the empty pallets must be supplied to the machine in timed relation with the other operations thereof and the pallets and finished blocks thereon must be continuously removed at the discharge end of the machine.

In general, the actual operations of removing the finished block and supplying empty pallets to the machine are not too time consuming, even with a cyclic machine, provided that both of these operations may be performed at the same place or station of the machine. The empty pallets and the finished blocks and pallets cannot be simultaneously fed into the machine and discharged from the same end of the machine at the same elevation unless these operation are performed alternately. However, this unduly prolongs the operating cycle of the machine and makes the operation thereof uneconomical.

The present invention solves this difficulty by feeding the empty pallets into the machine at an elevation below that at which the blocks are discharged from the machine and thereafter raising the pallets and moving the same into a position below the mold box immediately after the finished block has been removed from the mold box. However, by such construction, it is necessary to lower the empty pallets externally of the machine in order to feed the same at an elevation below the discharging finished block. The operation of successively and continuously removing finished blocks at one elevation and replacing empty pallets at another substantially lower elevation is tiring and fatiguing, particularly in multiple mold machines wherein the number of finished blocks discharged and the number of empty pallets required by the machine are multiplied during a given time period.

The pallets used with machines of this type are flat, relatively thin but heavy plates. For this reason, they are very difficult to handle and particularly difficult to place in a uniform stack. In practice, the pallets are frequently handled by electromagnets or other similar devices, preferably two at a time. It is accordingly desirable to provide a pallet handling mechanism which is adapted to receive two pallets side by side at one time and which is also adapted to lower the pallets into a single uniform stack for subsequent indexing into the machine.

It is accordingly an important object of this invention to provide a pallet handling mechanism having a provision for receiving the empty pallets at the block discharge end of the machine whereby a single operator may easily remove the finished blocks as they are formed by the machine and also continuously supply empty pallets to the pallet handling mechanism at the same end of the machine and from approximately the same elevation of the machine.

Another object is to provide an indexing mechanism adapted to automatically feed pallets to a pallet conveyor mechanism in timed relation with the other operations of the machine and to provide a pallet conveyor mechanism for simultaneously carrying the indexed pallets to the machine and the finished blocks from the machine.

Another object of the invention is to provide a conveyor mechanism which includes an endless pallet conveyor belt supported for movement longitudinally of the machine in an essentially vertical plane and a means for supporting the pallets during their movement below the conveyor belt and during their elevation to a position on top thereof.

Another object is to provide a pallet handling mechanism which includes a plurality of longitudinally spaced pallet pushers along the length of an endless conveyor chain adapted to engage the pallets and move the same therewith, a wear bar or track for slidably supporting the pallets below the endless chain and adapted to maintain the pallets in contact with the pallet pushers, and a pallet elevator at one end of the endless conveyor chair for engaging the pallets and holding the same in contact with the pallet pushers during their movement from below the endless chain conveyor to a position on top thereof.

Another object is to provide a pallet lowering mechanism which includes a plurality of longitudinally spaced the elevation of the discharging finished blocks and automatically position the same in a uniform stack for subsequent indexing into the machine by an indexing mechanism.

Another object of the invention is to provide a pallet conveyor mechanism, a pallet lowering mechanism and a pallet indexing machanism of the above type which are simple, relatively inexpensive, quiet, dependable and efficient.

Another object is to provide a pallet handling mechanism which prolongs the life of the pallets by reversing the pallets each time they are used so that both of the faces thereof alternately come into use.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The pallet handling mechanism of the present invention may be utilized with any type of block molding machine or similar device which employs separate, removable pallets that form a part of the mold box of the machine during filling thereof and during compaction of the material therein. The pallet handling mechanism is disclosed herein in connection with a fully automatic, cyclic machine which completes the molding and ejection of one block and immediately commences another cycle. The pallet handling mechanism permits the completion of the work cycle of the machine in the shortest possible time period so as to attain maximum production of molded blocks from the machine. While the illustrated block molding machine utilizes only a single mold box, the pallet handling mechanism is particularly useful with multiple mold machines which require an increased number of pallets over a given time period, such as that disclosed in my co-pending application, Serial No. 51,553, filed September 28, 1948, now Patent No. 2,660,189. When it is desired to use the pallet handling mechanism of the present invention with a multiple mold machine, it is merely necessary to adjust the timing means which controls the operation of the indexing and conveyor mechanisms to accommodate for the additional molding operations.

Figure 1:
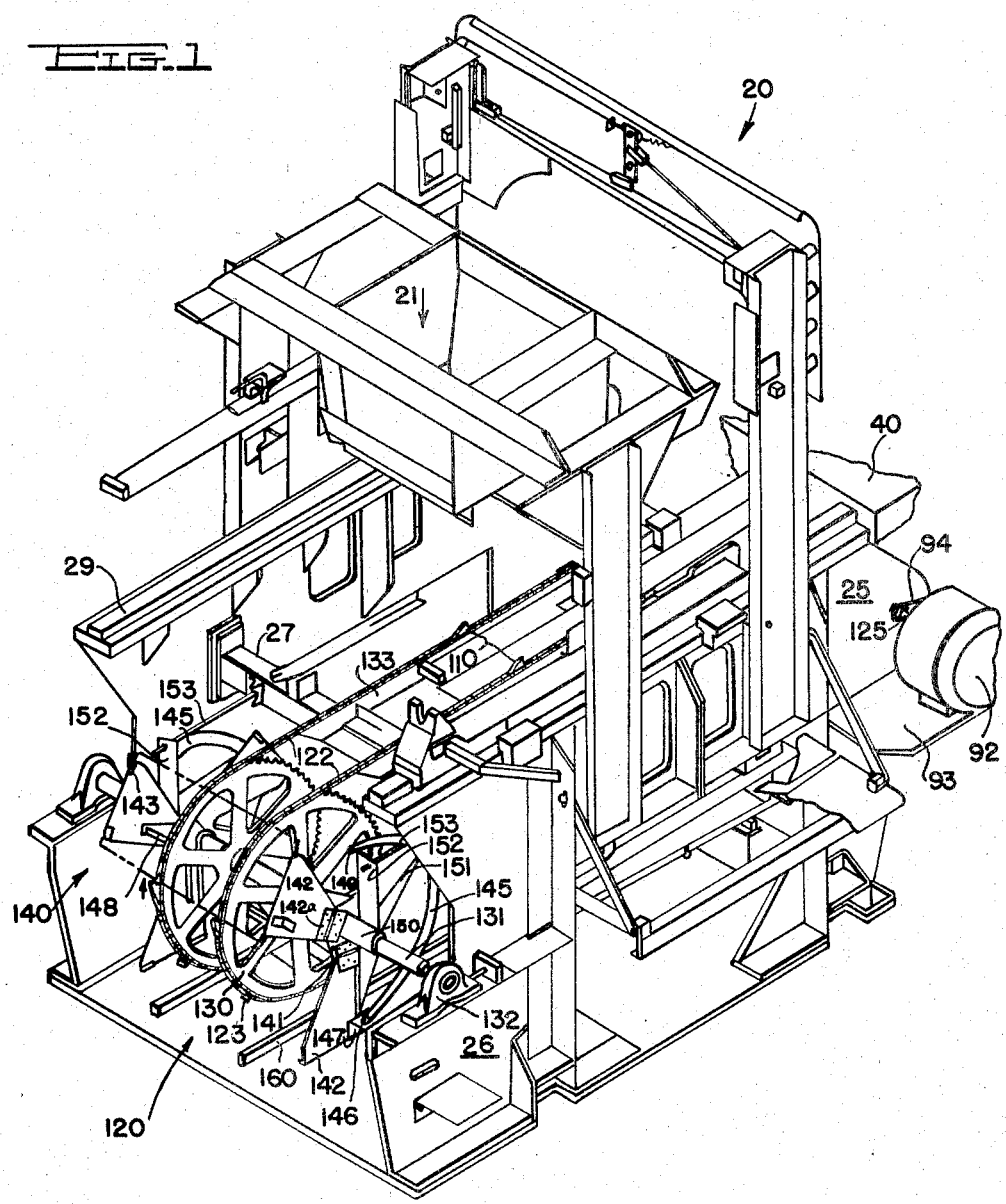
Fig. 1 is a fragmentary perspective view of a pallet handling mechanism embodying the features of the present invention and shown in assembled relation with a concrete molding machine.
Figure 2:
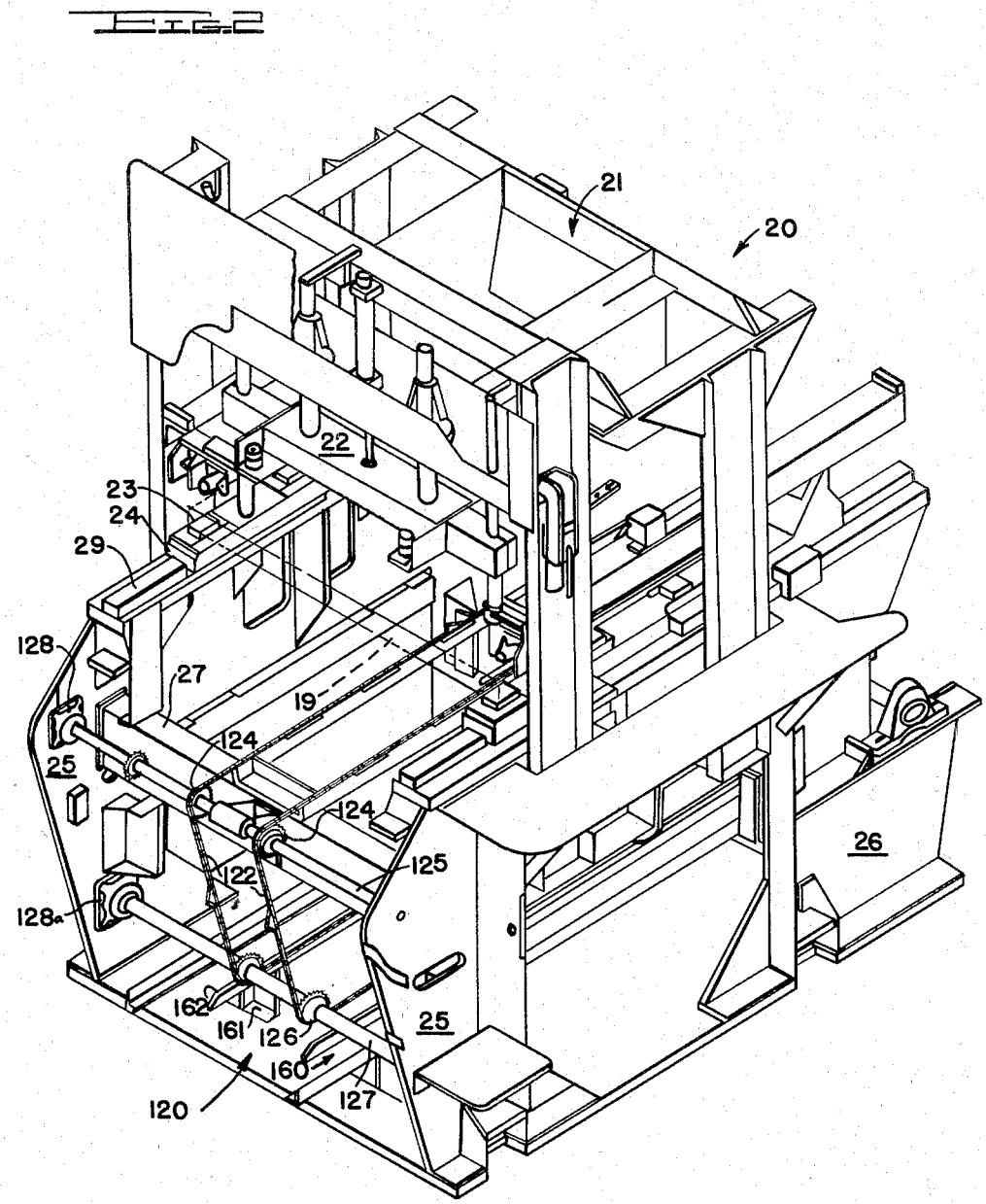
Fig. 2 is a perspective view of the conveyor mechanism of the pallet handling mechanism of the present invention shown in assembled relation with a molding machine and taken from the opposite corner of the machine relative to Fig. 1 and having the pallet lowering mechanism and pallet indexing mechanism removed for clarity.

The molding machine 20, shown in Figs. 1 and 2 of the drawings, is a fully automatic, single mold, cyclic type and is particularly adapted for the manufacture of concrete blocks. In general, the work cycle of this molding machine 20 comprises raising a pallet 30 into operative position wherein it covers the bottom of a mold box, filling the mold with a concrete mix from a material feed chute 21, moving the filled mold to a finishing station where compaction of the material in the mold is completed under a pressure head 22 and then removing the pallet with the compacted mix to unload the mold for the next cycle. In the particular molding machine shown in the drawings, controlled vibration of the mold box is utilized at all times during the mold filling operation and during the final compaction of the material therein. The amount of material fed to the mold box is controlled by controlling the length of time the mold box is positioned below the feed chute. The finishing head 22 acts as a retaining member when moved into the mold box and holds the concrete mix therein during finishing of the molding operation to provide a finished surface on the compacted mix. The finishing head also acts as a ram to assist in removing the mix and pallet from the mold.

The mold box 19 is shown in phantom in Fig. 2 of the drawings. It is a permanent part of the molding machine and is normaly positioned on a plurality of rubber pads 23 and is movable between the material feed hopper 21 and the pressure head 22 on the slides 24. The slides 24 are movably supported on the rails 29.

The pallet handling mechanism embodying the features of the present invention feeds empty pallets to the molding machine 20 and carries the finished blocks formed thereby to the discharge end of the machine. The empty pallets are supplied to the pallet handling mechanism at the same block discharge end of the machine and at approximately the same elevation that the finished blocks are discharged therefrom.

Figure 3:
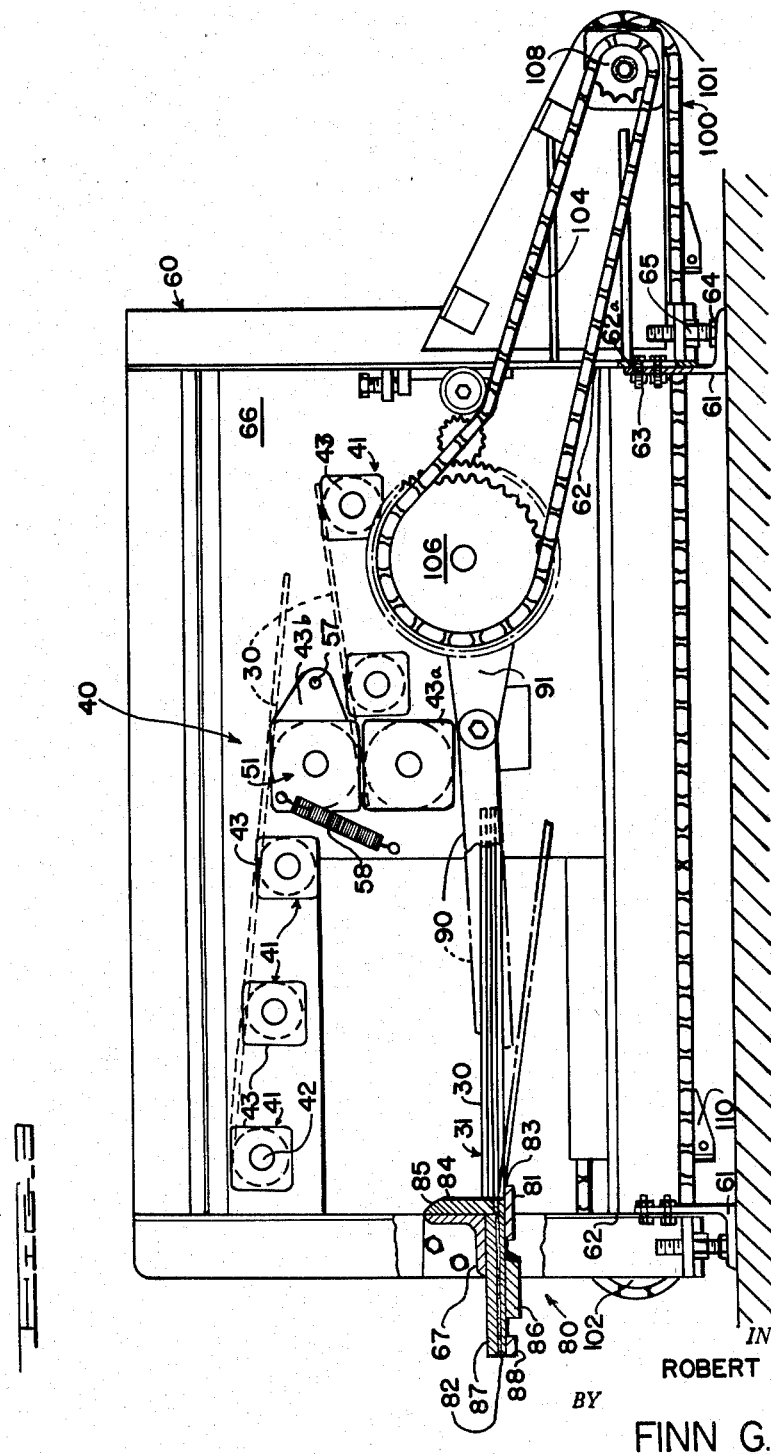
Fig. 3 is a side view, partly in section, of a pallet lowering mechanism and pallet indexing mechanism embodying the features of the present invention.
Figure 4:
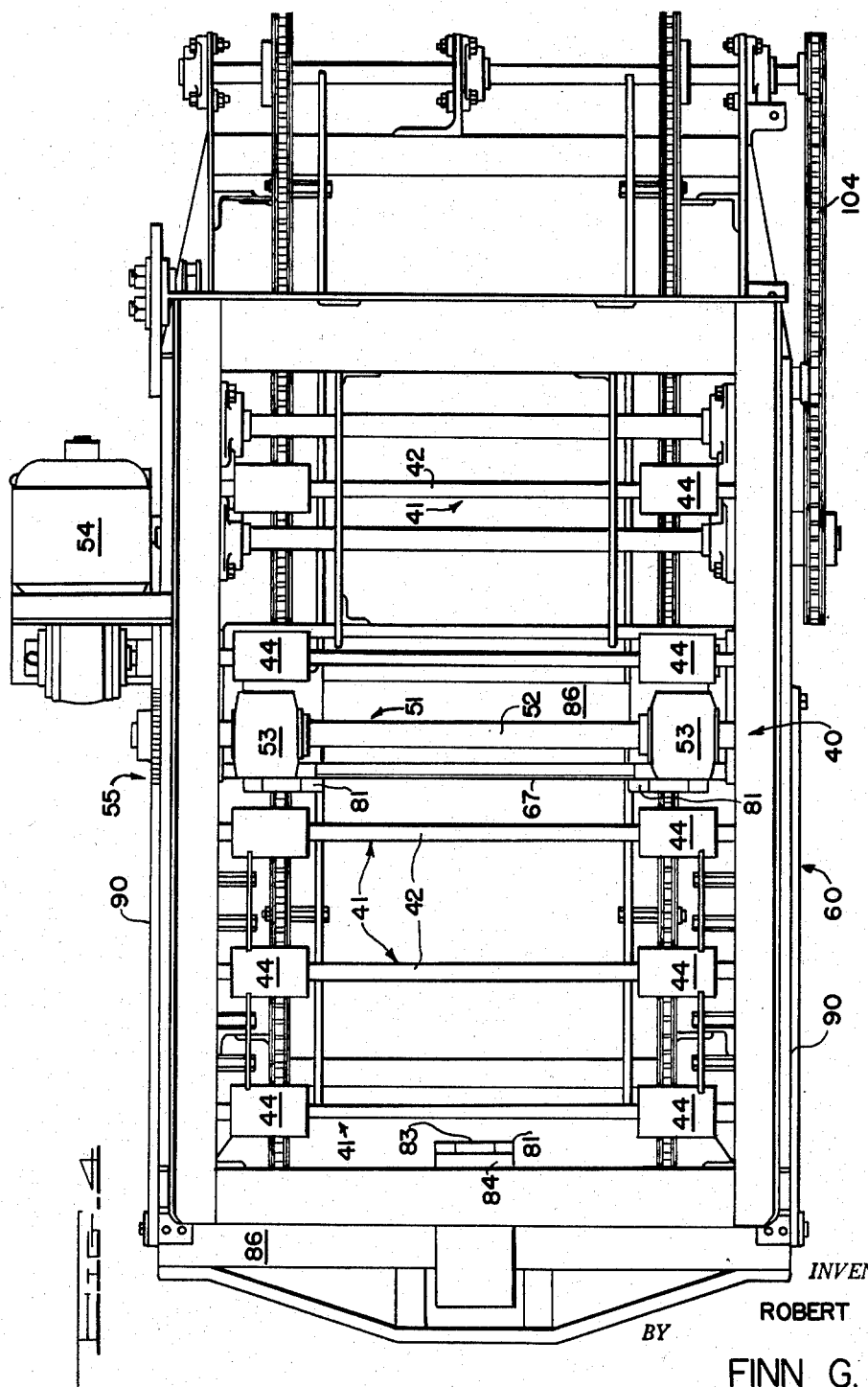
Fig. 4 is a plan view of the pallet lowering mechanism and pallet indexing mechanism shown in Fig. 3.

The pallet handling mechanism shown in the drawings comprises generally a pallet lowering mechanism or pallet shuttle 40, shown particularly in Figs. 3 and 4 of the drawing; a pallet indexing mechanism 80 which controls and times the feed of the empty pallets 30 to the machine in timed relation with the other operations thereof; and a pallet conveyor mechanism 120 shown particularly in Figs. 1 and 2 of the drawings, which carries the empty pallets 30 from the pallet indexing mechanism 80 to a position immediately below the mold box of the concrete block machine 20, from whence it is raised into operative position with the mold box by the machine and which carries the pallet and finished block thereon out of the machine after the filling and compaction operation of the molding machine.

The pallet conveyor mechanism 120, in general, includes a pair of endless belt or chain conveyors 122, each movable longitudinally of the molding machine in an essentially vertical plane and having a plurality of longitudinally spaced pallet pushers 123 extending outwardly therefrom and adapted to engage the pallets 30, a pallet wear bar or track 160 positioned below the lower section of the chain conveyors 122 and adapted to slidably support the pallets 30 in contact with the pallet pushers 123 during their movement longitudinally of the machine, and a pallet elevator mechanism 140 positioned at one end of the pallet conveyor chains 122 for maintaining the pallets on the chains and in contact with the pallet pushers 123 while the pallets are moved to a position on the top section of the pallet conveyor chains 122.

The pallet lowering mechanism 40 and the pallet indexing member 80 are each housed and supported by a frame structure 60 which is positioned at the forward end of the molding machine, as shown particularly in Fig. 1. The frame is supported at each of its four corners on an adjustable foot 61 (Fig. 3). Each foot is adjustably secured to an upright 62 of the frame 60 by a pair of bolts 63 and is held in its adjusted position by means of an adjustment bolt 64 and a lock nut 65. As shown, each foot 61 comprises an angle bracket provided with spaced holes in the vertical portion thereof through which the bolts 63 are adapted to pass. The upright 62 is provided with an elongated adjustment slot 62a for receiving the bolts 63.

The pallet lowering mechanism 40 in the embodiment shown in Figs. 3 and 4 of the drawings comprises two sets of idler rollers inclined in opposite directions and a pair of drive rollers positioned between the sets of idler rollers. The uppermost set of idler rollers includes three rollers 41 which are arranged in a common plane inclined toward the molding machine and the other set of idler rollers includes two rollers 41 which are positioned in a common plane inclined in the opposite direction. The upper surface of the top drive roller 51 lies in substantially the same plane as the top of the first set of rollers 41 and the upper surface of the lower drive roller 51 lies in substantially the same plane as the upper surface of the second set of idler rollers 41. In addition, the drive rollers 51 are positioned relative to each other to frictionally engage but to permit the passage of pallets 30 therebetween from the second set of idler rollers to the indexing mechanism 80.

Each of the idler rollers 41 includes a shaft 42 having the ends thereof freely journaled in suitable bearings 43 mounted on the side panel 66 of the frame 60 and a pair of resilient rollers 44, constructed of rubber or other suitable material, axially spaced on the shaft 42.

Each of the driven rollers 51 is also provided with a shaft 52 journaled in bearings 43a and 43b on the side panel 66 of the frame 60 and a pair of rubber rollers 53 axially spaced on the shaft 52 for engaging and driving the pallets 30. The upper drive roller 51 is mounted for limited vertical movement relative to the lower drive roller, being pivotal about the pivot pin 57, but is resiliently held in its lowermost position by the spring 58 secured to the bearing 43b and the side panel 66 of the frame 60.

As shown in Fig. 4 of the drawings, the drive rollers 51 are driven by an electric motor 54 mounted on the side panel 66 of the frame 60 through the gears 55. The drive rollers 51 are adapted to rotate in opposite directions, the uppermost roller rotating clockwise. Either one or both of the rollers may be driven by the motor 54.

The pallet indexing mechanism 80 shown particularly in Figs. 3 and 4 comprises, generally, three pallet ledges 81, one positioned on the forward end of the frame 60 and the other two positioned immediately below the driven rollers 51; a pallet release slide 82 movable within a groove 83 in each of the pallet ledges 81 and adapted to move the lowermost pallet 30 in the stack 31 in a horizontal plane to thus successively release the pallet 30 from the rear ledges and from the forward ledge respectively; and the pallet conveyor chain 100 for carrying the released pallets 30 to the pallet wear bar 160 of the pallet conveyor mechanism 120.

The pallet ledges 81 are secured to the angle bars 67 of the frame 60 and extend inwardly so as to engage the pallets 30 after they are released by the pallet lowering mechanism. A pallet guide plate 84 is positioned above the forward pallet ledge 81 and is provided with a chamfer 85 to guide the pallets into a uniform stack 31. The guide plate 84 is also secured to the angle bar 67 of the frame 60.

The pallet release slides 82 are each secured such as by welding to a transverse plate 86 which extends completely across the frame 60 and connects at opposite ends to a slide tie 90, which in turn is connected to a crank 91. The latter is driven by the motor 92 mounted on the side panel 93 of the panel 25 by means of the chain 94 and is adapted to move each of the pallet release slides in unison in reciprocal horizontal motion in timed relation with the operation of the endless belt conveyor 122. A single pallet is released each time the crank 91 completes a revolution.

Each of the pallet slides 82 is movable within the longitudinal groove 83 in the pallet ledges 81 and are held therein by a slide holder 87 and a slide cover 88. The slide holder and cover are each secured to the angle bar 67 of the frame 60 by any suitable means.

The pallet conveyor belt 100 is passed over suitable sprockets 101 and 102 at opposite ends of the frame 60 and is driven in synchronism with the pallet release slides 82 by the chain drive 104. The latter passes over the drive gear 106 and the sprocket 108. The pallet conveyor chain 100 is provided with a plurality of longitudinally spaced pallet pushers 110 secured to the outer periphery thereof which are adapted to engage the pallet as they are released by the pallet release slide 82 and move the same onto the pallet wear bar 160.

The endless belt conveyor 122 may be of any suitable type which will carry the pallet 30 from the discharge end of the machine, to a position below the open bottom of the mold box of the molding machine and will permit the pallet to be raised therefrom into operative position with the mold box. As shown particularly in Fig. 2, the pallet conveyor belt comprises a pair of endless chains 122, each of which pass over a drive sprocket 124 on the drive shaft 125 and an idler roller 126 carried by the shaft 127. The drive shaft 125 is intermittently driven by the motor 92 in timed relation with the operation of the molding machine. Each of the shafts 125 and 127 are journaled on the side panels 25 of the block machine in bearings 128 and 128a. As shown particularly in Figure 1, the conveyor chains 122 also pass over a pallet elevator sprocket 130 positioned at the opposite end of the machine. The pallet elevator sprocket 130 is provided with peripheral teeth for engaging within the individual links of the chain so that movement of the latter may be accurately timed and synchronized with the other operations of the molding machine. The pallet elevator sprocket 130 is carried by a pallet elevator shaft 131 which is in turn journaled for rotation in bearings 132 mounted on a bracket 26 of the molding machine.

A pallet conveyor chain support 133 is positioned below the upper longitudinal section of the pallet chain conveyor 122 and is mounted on a pair of beams 27 provided by the molding machine 20.

The pallet wear track 160 includes a pair of longitudinally extending bars which, as shown particularly in Fig. 2, are mounted on the base 28 of the molding machine by a plurality of bracket supports 161. The forward end of the bars are chamfered at 162 to guide the pallet onto the wear track from the conveyor belt 100 of the indexing mechanism 80.

The pallet elevator mechanism 140 (Fig. 1) for raising the pallets 30 from the pallet wear track 160 to the top of the conveyor chains 122 comprises generally a set of camming arms on each side of the conveyor chain 122 adapted to rotate with the pallet elevator sprocket 130. Each set of camming arms includes a hexagon shape hub 141 secured to the pallet elevator shaft 131 and three camming arms 142 individually hinged on the hub by the hinges 142a for movement toward and away from the conveyor chains 122. Each of the pallet arms 142 is provided with a pair of pallet engaging lugs 143 spaced at opposite sides of the outermost ends thereof which engage the pallets during their movement from the pallet wear bar 160 to a position on the uppermost section of the conveyor chains 122.

Each of the camming arms 142 is also provided with a cam roller 146 journaled for rotation on an angle bracket 147 secured to the outer surface of the camming arms 142. A pair of semi-circular cams 145 are also provided which are adapted to be engaged by the rollers 146 on the camming arms 142. Each of the cams 145 is journaled on the pallet elevator shaft 131 by a bushing 150 and a plurality of radially extending brackets 151 and 152. The cams are prevented from rotation with the shaft by a tie rod 153 secured to the beam 27 of the molding machine and also secured to the bracket 152 of the cam 145.

In the operation of the pallet handling mechanism, the empty upper pallets are placed on the idler rollers 41, either singly or in pairs. The pallets roll by gravity down the inclined surface onto the driven rollers 51. The pallet on the uppermost set of rollers moves over the upper drive roller 51 and onto the other set of idler rollers 41. The pallet then moves by gravity between the driven rollers and is ejected into the indexing mechanism 80.

As shown particularly in Fig. 3, the new supply of pallets is guided into a uniform stack 31 on the three pallet ledges 81 by the pallet guide plate 84. The pallets 30 are removed from the stack 31 from the bottom thereof as required by the operating cycle of the molding machine and carried into the machine by the pallet conveyor mechanism.

Indexing a pallet 30 from the bottom of the stack 31, the lowermost pallet is moved to the left as viewed in Fig. 3 by the pallet release slides 82 until the rear end of the pallet moves beyond the ends of the two rear pallet ledges 81. The partially released pallet then tilts downwardly by gravity (as shown in broken lines) below these two ledges and the pallet release slides move in the reverse direction to release the forward end of the pallet.

These movements of the pallet release slides are effected by the motor 92 through the crank mechanism 91 and slide ties 90. The motor 92 also simultaneously operates the pallet conveyor chain 100 which moves the pallet longitudinally of the frame 60 and deposits the pallet, with the aid of one pair of pallet pushers 110 on the forward end of the pallet wear track 160 (Fig. 2).

The pallet chain conveyor 122 is then operated to carry the pallet into a position below the mold box of the molding machine. With particular reference to Fig. 2 of the drawings, the pair of pallet pushers 123 on the chain conveyor 122 engages the forward edge of the pallet and pushes the same on the wear track to the opposite end of the molding machine. As the pallet reaches a point adjacent the pallet elevator sprocket 130, the pallet elevator engages opposite sides of the pallet and maintains the same in contact with the pair of pallet pushers 123 until the pallet has been carried to a position wherein it rests on top of the conveyor chains.

With reference to Fig. 1, it may be seen that as the pallet 30 reaches the rear end of the pallet wear bar 160, the pallet conveyor chains 122 begin their upward movement around the pallet elevator sprockets 130. At this instant, the cam rollers 146 on the downwardly extending camming arms 142 are leaving the lower end of the semi-circular cam 145. The spring 148 thus pivots the caming arms into their innermost position and into engagement with the pallet 30, so that the pallet engaging lugs 143 extend beneath the pallet. As the pallet elevator sprockets and sets of camming arms are rotated, the pallet 30 is supported at opposite sides by the camming arms 142 and lugs 143 as well as by the pallet pushers 123 on the conveyor chains 122.

As the pallet reaches a point adjacent the top of the elevator sprocket, the cam rollers 146 on the camming arms 142 again engage the cams 145 and suddenly move the arms outwardly in response to movement of the rollers on the curved end 149 of the cam 145. The camming arms 142 are retained in their outward position by the cams 145 during downward rotation thereof and while the pallet is moved into position under the mold box (and feed chute) of the molding machine.

The conveyor chains are momentarily stopped while the empty pallet is raised into operative position with the mold box and until the pallet accompanied by a finished block is again lowered thereon. The block and pallet is then moved out of the machine and removed from the conveyor chain.

While the operation of the pallet handling mechanism has been described with reference to only a single pallet, it is to be understood that additional pallets are continuously indexed into the machine and accordingly at any one time there are several pallets positioned at various stages throughout the mechanism.

In actual operation, a table formed of a series of horizontal rollers is normally positioned above the frame 60 and in horizontal alignment with the upper section of the conveyor chains 122, which facilitates the removal of the finished blocks, preferably at the forward end of the frame 60. This table may be of any desired type and accordingly is not shown in the drawings since it forms no part of the present invention.

It should be apparent from the foregoing that the pallet handling mechanism disclosed herein is adapted to be supplied with empty pallets at the same end of the molding machine that the finished blocks are discharged therefrom. The pallets may be easily and readily placed within the pallet lowering mechanism at substantially the same elevation that the finished blocks are removed and thus a single operator, or at least a minimum number of operators, may operate the machine without any undue inconvenience or work. In order to quicken the supplying of empty pallets, the pallet lowering mechanism is adapted to receive two pallets at a time in side by side relationship and to uniformly stack the pallets in a single stack in the indexing mechanism.

The pallet conveyor mechanism is adapted to carry the finished blocks from the molding machine upon ejection therefrom and simultaneously provide an empty pallet in position below the mold box for use in the next cycle of the machine. As described above, the pallet handling mechanism includes an endless conveyor chain supported for movement longitudinally of the machine in an essentially vertical plane, and is provided with a longitudinally extending wear track and a pallet elevator mechanism which cooperate with the pallet pushers on the conveyor chain to support and move the pallet below the chain and into a position on the top thereof.

The pallet handling mechanism, including the pallet conveyor mechanism, the pallet lowering mechanism and pallet indexing mechanism, are very simple, relatively inexpensive, durable, dependable, quiet and efficient.

It should also be noted that each time a pallet is passed through the pallet handling mechanism, it is turned over so that the faces of the pallet are alternately used and thus the life of each pallet is prolonged.

Having thus described my invention, I claim:

1. A pallet conveyor mechanism for a molding machine comprising an endles chain mounted for movement longitudinally of the machine substantially in a vertical plane, a rotatable sprocket mounted for rotation in said plane and having a portion partially encircled and in mesh with said chain for elevating said chain on movement thereof from a lower to an upper level, a plurality of pallet pushers spaced along said chain, each pusher being adapted to engage an edge of a pallet and move the same therewith in response to movement of said chain, a generally horizontal pallet wear track positioned below said chain and adapted to support pallets therealong in slidable relation and in engagement with said pallet pushers, and an elevator mechanism for maintaining the pallets in engagement with said pallet pushers during upward movement thereof around said sprocket, said elevator mechanism comprising a set of cam actuated arms on each side of said chain and supported on hubs journaled for rotation with said sprocket, each of the cam actuated arms extending radially from its hub and having its distal end movable toward and away from said plane, each distal end having at least one pallet engaging lug adapted when its arm is pivoted toward said plane to engage the lower surface of a pallet and to lift the same from said pallet wear track and then to maintain the pallet in engagement with the associated pallet pusher until the pallet is moved to substantially the uppermost position on said sprocket, and a pair of cams on opposite sides of said sprocket and engageable by said arms for pivoting each arm away from said plane when such arm is at the top of its travel and for retaining such arm in that pivoted position until it reaches approximately the bottom of its travel.

2. A pallet conveyor mechanism in accordance with claim 1 and being further characterized in that said pivotally supported arms are normally resiliently held in a position pivoted toward said plane.

3. A pallet conveyor mechanism in accordance with claim 2 and further characterized in that said cams are semi-circular and said pivotally supported arms are each provided with a cam roller adapted to engage said cams and hold the arms away from said plane during downward rotation thereof.

4. A pallet conveyor mechanism for a molding machine comprising an endless conveyor chain mounted in a generally vertical plane for movement longitudinally of the machine and having a plurality of longitudinally spaced pallet pushers mounted thereon and extending outwardly from the outer surface of said chain and adapted to engage and move the pallets therewith in response to movement of the conveyor chain, a pallet track positioned below said conveyor chain and adapted to support a series of pallets in slidable relation and in engagement with said pallet pushers during movement of the pallets longitudinally of the machine, and an elevator mechanism for maintaining each successive pallet in engagement with its associated pallet pusher while each successive pallet is moved from a selected position below said conveyor to a position on top thereof, said elevator mechanism including holding means for engaging the side away from said chain of each successive pallet as it arrives at said selected position and for holding said pallet in position to be lifted by its associated pusher to a position on top of said conveyor chain, and other means for automatically effecting release of said holding means from each successive pallet as such pallet is positioned on top of said conveyor chain and for enabling the holding means thereafter to engage other pallets only when said other pallets are located in said selected position.

References Cited in the file of this patent

UNITED STATES PATENTS

| | | |
|---|---|---|
| 694,767 | Mahoudeau | Mar. 4, 1902 |
| 2,593,627 | Stover | Apr. 22, 1952 |
| 2,761,572 | Baker | Sept. 4, 1956 |

FOREIGN PATENTS

| | | |
|---|---|---|
| 530,362 | Germany | July 28, 1931 |